United States Patent [19]
Deguchi et al.

[11] Patent Number: 5,278,814
[45] Date of Patent: Jan. 11, 1994

[54] APPARATUS FOR RECORDING AND REPRODUCING INFORMATION ON AND FROM AN OPTICAL DISK

[75] Inventors: Toshihisa Deguchi, Nara; Hiroshi Fuji, Kitakatsuragi; Shigeo Terashima, Tenri, all of Japan

[73] Assignee: Sharp Kabushiki Kaisha, Osaka, Japan

[21] Appl. No.: 508,200

[22] Filed: Apr. 12, 1990

[30] Foreign Application Priority Data

Apr. 13, 1989 [JP] Japan .................................. 1-95648

[51] Int. Cl.⁵ .................................................. G11B 7/00
[52] U.S. Cl. .................................... 369/47; 369/44.26; 369/50; 369/58; 369/275.3
[58] Field of Search ............... 369/32, 33, 43, 44.25, 369/44.26, 44.34, 47, 48, 53, 54, 58, 59, 60, 109, 110, 124, 275.1, 275.3, 275.4, 50; 358/342; 360/32, 70, 71, 135, 78.04

[56] References Cited

U.S. PATENT DOCUMENTS

| | | | |
|---|---|---|---|
| 4,566,091 | 1/1986 | Gerard et al. | 369/47 X |
| 4,710,909 | 12/1987 | Tsuyashi et al. | 369/44.34 |
| 4,791,622 | 12/1988 | Clay et al. | 369/48 X |
| 4,873,679 | 10/1989 | Murai et al. | 369/44.11 X |
| 4,896,311 | 1/1990 | Ishihara | 369/59 X |
| 4,908,810 | 3/1990 | Oie | 369/32 X |
| 4,933,922 | 6/1990 | Yokogawa | 369/44.34 X |
| 4,967,403 | 10/1990 | Ogawa et al. | 369/44.26 X |
| 4,977,550 | 12/1990 | Furuya et al. | 369/32 X |
| 4,991,033 | 2/1991 | Takeshita | 360/32 X |
| 5,012,460 | 4/1991 | Popovich et al. | 369/44.26 X |
| 5,038,339 | 8/1991 | Pasman et al. | 369/275.3 X |
| 5,063,546 | 11/1991 | Ito et al. | 369/44.26 X |
| 5,073,880 | 12/1991 | Maeda et al. | 369/32 X |

FOREIGN PATENT DOCUMENTS

| | | |
|---|---|---|
| 0144058 | 6/1985 | . |
| 0176755 | 4/1986 | . |
| 0218214 | 4/1987 | . |
| 0241978 | 10/1987 | . |
| 60-177404 | 9/1985 | Japan . |
| WO88/01786 | 3/1988 | . |

OTHER PUBLICATIONS

English abstract of Publication No. 60-177404 – laid open Sep. 11 1985.

Primary Examiner—W. R. Young
Attorney, Agent, or Firm—Nixon & Vanderhye

[57] ABSTRACT

An apparatus for recording and reproducing information on and from an optical disk is disclosed in which at least one optical beam and a reference clock signal are used. The optical disk comprises recording tracks which are divided into a plurality of blocks and concentrically arranged along the radial direction. The apparatus comprises: a block judging unit for judging one of the blocks that the one block is currently impinged by the optical beam; a clock signal generator for generating a plurality of clock signals which are different in frequency from each other; and a clock signal selecting unit for selecting one of the clock signals as the reference clock signal, on the basis of the judgement of the block judging unit.

13 Claims, 5 Drawing Sheets

FIG. I

APPARATUS FOR RECORDING AND REPRODUCING INFORMATION ON AND FROM AN OPTICAL DISK

BACKGROUND OF THE INVENTION

1. Field of the Invention:

This invention relates to an apparatus for recording and reproducing information on and from an optical disk using an optical beam, and an optical disk for storing information useful in such an apparatus. In the specification and accompanying claims, the term "an optical disk" includes an optical disk in which information cannot be rewritten (e.g., a so-called compact disk) and also that in which information can be rewritten (e.g., a magnetooptical disk), and the term "an apparatus for recording and reproducing information" means an apparatus which can record and/or reproducing information on and from an optical disk.

2. Description of the Related Art:

In an apparatus for recording and reproducing information on and from an optical disk using an optical beam, tracking servo control is performed so that an optical beam such as a laser beam accurately traces recording tracks preformed in the optical disk. In order to perform the tracking servo control, the continuous tracking servo method is widely employed which uses servo control signals obtained from guiding grooves or data pits preformatted in an optical disk for guiding a laser beam along the recording tracks.

An optical disk used in the continuous servo method has preformed continuous grooves or data pit rows so that the servo control signal can be easily obtained from the grooves or pit rows independently of the data recording density or recording method. Therefore, this method can be applied to optical disks with various formats.

When using an optical disk on which data is recorded based on variations in the reflectivity of the recording medium or the presence and absence of pits, however, the continuous servo method does suffer from deterioration of the servo control signal obtained from the grooves or pit rows near the recording areas, due to the effect of the recorded signal. Furthermore, the quality of the servo control signal tends to be affected by slight dimensional inaccuracies such as shape errors in the guide grooves. Therefore, it is difficult to obtain compatibility between various disk types.

As another method for performing the tracking servo control, the sample servo method is employed which uses a tracking servo control signal obtained from servo bytes preformatted in sampling areas which are formed locally on the optical disk. In the sample servo method, a phase lock loop (PLL) circuit generates a reference clock signal in synchronization with the timing with which an optical beam passes the servo bytes. Based on this reference clock signal, a tracking servo control signal is obtained from the servo bytes, and the timing with which the data signal is written and/or read is controlled.

In the sample servo method, the sampling areas are completely separated from the areas in which data is recorded, and therefore the tracking servo control signal is not affected by the recording signal and a tracking servo control signal of high quality can be easily obtained. Furthermore, the formation of sampling areas specialized for the tracking servo control allows the apparatus to use a relatively simple detection means, resulting in that the sample servo method can offer a wider range of disk compatibility than the continuous servo method.

When a focus servo control is performed against an optical disk having guide grooves in the astigmatic method, the presence of the guide grooves may cause a shadow to form in a beam spot on an optical detector, thereby necessitating the precise positioning of the optical detector. Since it is not necessary to form guide grooves in an optical disk used in the sample servo method, in contrast, such a shadow does not form even when a focus servo control is conducted. This results in that the servo control can be accurately executed without excessively accurate positioning of an optical detector. Therefore, the sample servo method offers advantages such as reduced steps in the assembly of the detector and an improved yield of an apparatus.

Generally, an optical disk is driven under either the constant angular velocity (CAV) control in which the rotational velocity of the disk is controlled so that its angular velocity is kept constant, or the constant linear velocity (CLV) control in which the rotational velocity of the disk is controlled so that the speed of the optical beam spot with respect to the optical disk (i.e., the linear velocity) is maintained constant.

While the CAV control is simple since the rotational velocity is kept constant irrespective of the irradiation position of the optical beam on the optical disk, the CAV control involves a disadvantage in that the recording density at the portion nearer the outer circumference of the disk becomes smaller, thus reducing the storage capacity of the disk as a whole.

In the CLV control, on the other hand, the storage capacity can be easily increased, but the rotational velocity of the optical disk must be varied in accordance with the change of the radial position of the optical beam spot on the optical disk. Moreover the extra time required for stabilizing the rotational velocity makes the access time longer.

To tackle these problems, the modulate-constant angular velocity (M-CAV) control has been proposed in which the rotational velocity of the optical disk is kept constant, the recording area of the disk is divided into a plurality of blocks comprising multiple tracks, and information is written and/or read using a clock signal having a higher frequency in the more outer block. According to this M-CAV control, it is possible to avoid the increase in the access time caused by the change of the rotational velocity, and in addition, the linear recording density near the outer circumference of the optical disk is not reduced, so the storage capacity can be easily increased.

However, in the M-CAV control, it is difficult to employ the sample servo method which has various advantages as described above, because of the reasons mentioned below.

That is, in the M-CAV control, the period with which the optical beam passes a servo byte changes with each block. Therefore, when a sample servo method is used, each time the optical beam moves in the radial direction of the optical disk and enters into another block, the tracking control cannot be correctly performed until the PLL circuit is pulled again into synchronism.

In the sample servo method, comparison pulses input to the PLL circuit per unit time is small in number so that, if the period with which the optical beam passes the servo byte changes greatly, the response time is prolonged until the PLL circuit is pulled again into synchronization to generate a stable reference clock signal. Consequently, even though the M-CAV control method does not require the change of the rotational velocity of the optical disk, it does result in longer access times.

When performing the M-CAV control in the sample servo method, therefore, it is difficult to shorten the overall access time while increasing the storage capacity of an optical disk.

SUMMARY OF THE INVENTION

According to the invention, an apparatus for recording and reproducing information on and from an optical disk, using at least one optical beam and a reference clock signal, said optical disk comprising recording tracks which are divided into a plurality of blocks, said blocks being concentrically arranged along the radial direction is provided, which overcomes the above-discussed and numerous other disadvantages and deficiencies of the prior art, the apparatus comprising: a block judging means for judging one of said blocks that said one block is currently impinged by said optical beam; a clock signal generating means for generating a plurality of clock signals which are different in frequency from each other; and a clock signal selecting means for selecting one of said clock signals as said reference clock signal, on the basis of the judgment of said block judging means.

In a preferred embodiment, the apparatus further comprises a mother clock signal generating means for generating a mother clock signal, said mother clock signal being supplied to said clock signal generating means.

In a preferred embodiment, the mother clock signal generating means is a phase lock loop circuit.

In a preferred embodiment, the clock signal generating means comprises a plurality of frequency dividers for dividing said mother clock signal, the outputs of said frequency dividers being supplied to t said clock signal selecting means as said clock signals.

In a preferred embodiment, the apparatus further comprises a reset means for resetting said frequency dividers.

In a preferred embodiment, the apparatus further comprises a driving means for rotating said optical disk at a predetermined angular velocity.

According to the invention, an optical disk for storing information is provided, comprising a plurality of blocks which are separated concentrically in the radial direction, each of said blocks including at least one recording tracks elongating tangentially, each of said recording tracks comprising a plurality of segments, each of said segments including a sampling area and a data region for storing information, said sampling area containing preformatted servo bytes, each of segments of tracks in the same block having the same central angle, the number of segments included in one track belonging to an outer block being greater than that of segments included in one track belonging to an inner block.

In a preferred embodiment, the mean length of segments belonging to one of said blocks is substantially the same as the mean lengths of segments belonging to other blocks.

In a preferred embodiment, one of said sampling areas in each said tracks is positioned on the same radius of said optical disk.

In a preferred embodiment, two or more of said sampling areas in each said tracks are positioned respectively on two or more radii of said optical disk.

Thus, the invention described herein makes possible the objectives of:

(1) providing an apparatus for recording and reproducing information on and from an optical disk which can increase the storage capacity of the optical disk and prevent the increase of the overall access time even when the M-CAV control is performed in the sample servo method;

(2) providing an apparatus for recording and reproducing information on and from an optical disk in which the reference clock signal can be quickly stabilized after the optical beam jumps from one block of the optical disk to another block;

(3) providing an apparatus for recording and reproducing information on and from an optical disk in which the servo control and the information reproduction and/or record can be quickly resumed after the optical beam jumps from one block of the optical disk to another block; and (4) providing an optical disk which can be used under the M-CAV control in the sample servo method, with increasing the storage capacity of the optical disk and preventing the increase of the overall access time.

By means of the above configuration, after the optical beam moves or jumps from a block to another block in the radial direction of the optical disk, the new block currently being irradiated by the optical beam is rapidly discriminated by the block judging means. Hereinafter, such a block currently irradiated by the optical beam is referred to as "a current block". Then, the clock signal selecting means selects the clock signal with the frequency corresponding to the current block among the clock signals generated by the clock signal generating means, based on the signal from the block judging means.

That is, even when the optical beam moves to another block, a stabilized reference clock signal can be obtained in a short time, so that the servo control and the writing and/or reading of information can be resumed quickly. Therefore, even if the linear recording density near the outer edge of the disk is increased by performing the M-CAV control while using the sample servo method, the overall access time is not increased.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 2:
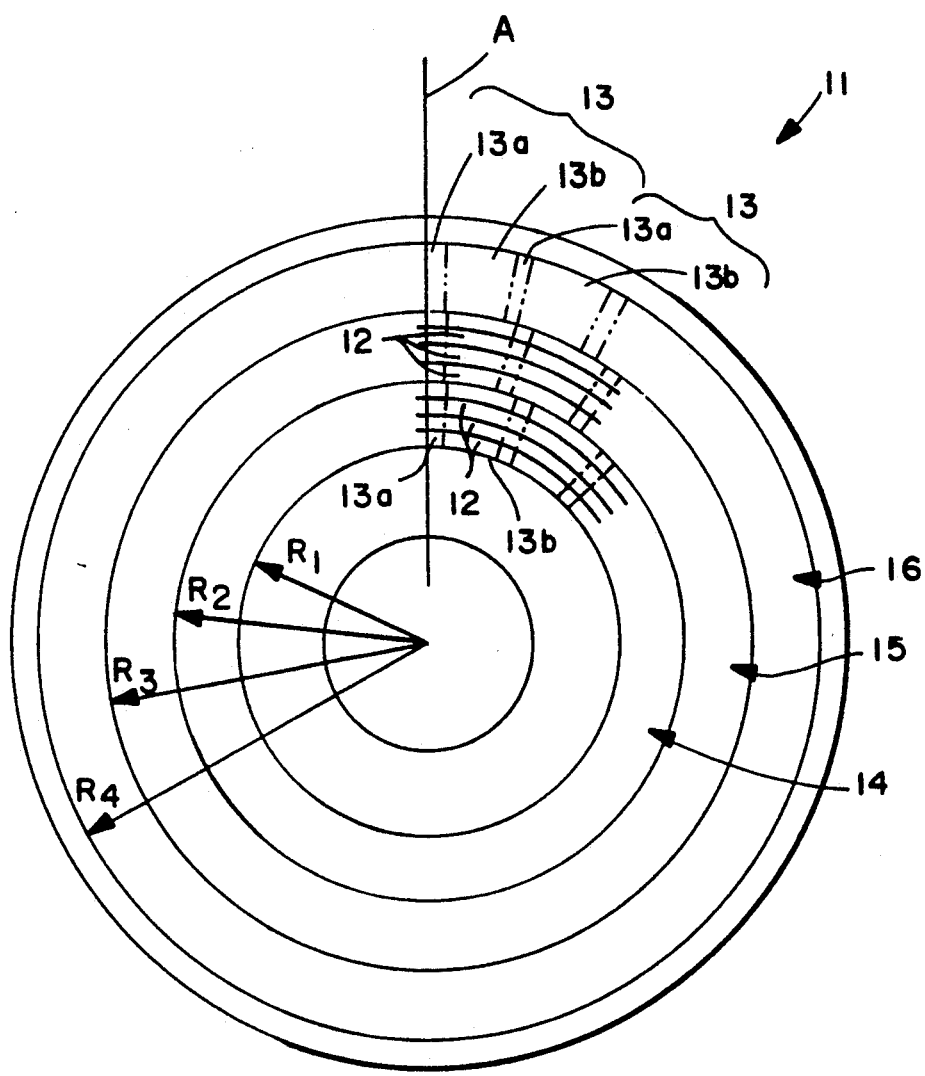
FIG. 2 illustrates an optical disk according to the invention.

FIG. 2 shows an optical disk according to the invention. In the optical disk 11 of FIG. 2, the recording area is divided into three blocks 14, 15 and 16 each having a plurality of concentric tracks 12. Namely, tracks 12 formed between radii $R_1$-$R_2$ constitute the first block 14. Likewise, tracks 12 formed between radii $R_2$-$R_3$ and between $R_3$-$R_4$ constitute the second and third blocks 15 and 16, respectively ($R_4 > R_3 > R_2 > R_1$).

Figure 3:
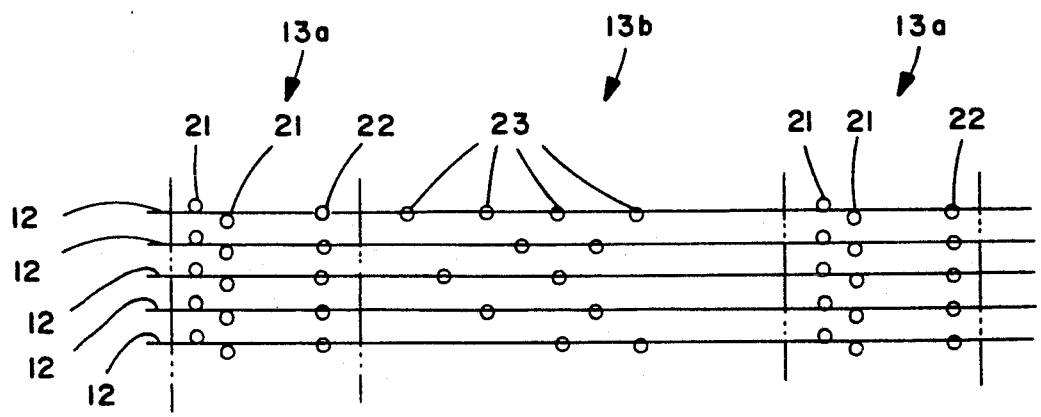
FIG. 3 is a diagram showing diagrammatically the structure of tracks formed in the optical disk of FIG. 2.

Each track 12 is divided into segments 13 each comprising a series arrangement of a sampling area 13a for generating the servo signal and a data area 13b for recording data. As shown in FIG. 3, the sampling areas 13a have a preformatted servo byte consisting of wobbled pits 21 for generating the tracking signal, and a synchronizing pit 22 for generating the synchronizing pulse. The tracking signal is used as the servo control signal. In the data areas 13b, data pits 23 for recording information are formed by a suitable means such as engraved pits, magnetically inverted patterns, etc. The wobbled pits 21 and synchronizing pits 22 are positioned according to the international standard ISO-DP9171-2.

In one block, the numbers of the segments 13 included in each of the tracks 12 are identical with each other. That is, in the same block, the segments 13 have the same central angle, so that the period with which the sampling areas 13a are irradiated by the optical beam is the same for any track in the same block when the optical disk 11 is rotated at a constant angular velocity.

In contrast, the number of the segments 13 belonging to one of the blocks differs from that of the segments 13 belonging to another of the blocks. More specifically, the numbers of the segments 13 are set so that tracks 12 in the outer blocks have more segments (i.e., the number of the segments in the block 16 is greater than that in the block 14). In other words, the mean length of the segments 13 belonging to one of the blocks 14-16 is substantially the same as that of the segments belonging to other one of the blocks 14-16, so that the linear recording density is approximately constant among the blocks 14-16.

In the embodiment, the positions of the segments 13 are set in such a manner that the sampling areas 13a of one of the segments 13 in each of the tracks 12 is positioned on the same or common radius A, thereby enabling the synchronization between the blocks 14-16 to be easily conducted. According to this arrangement, moreover, the synchronizing pits 22 can be readily detected even when the optical beam is traversing the tracks 12.

Figure 1:
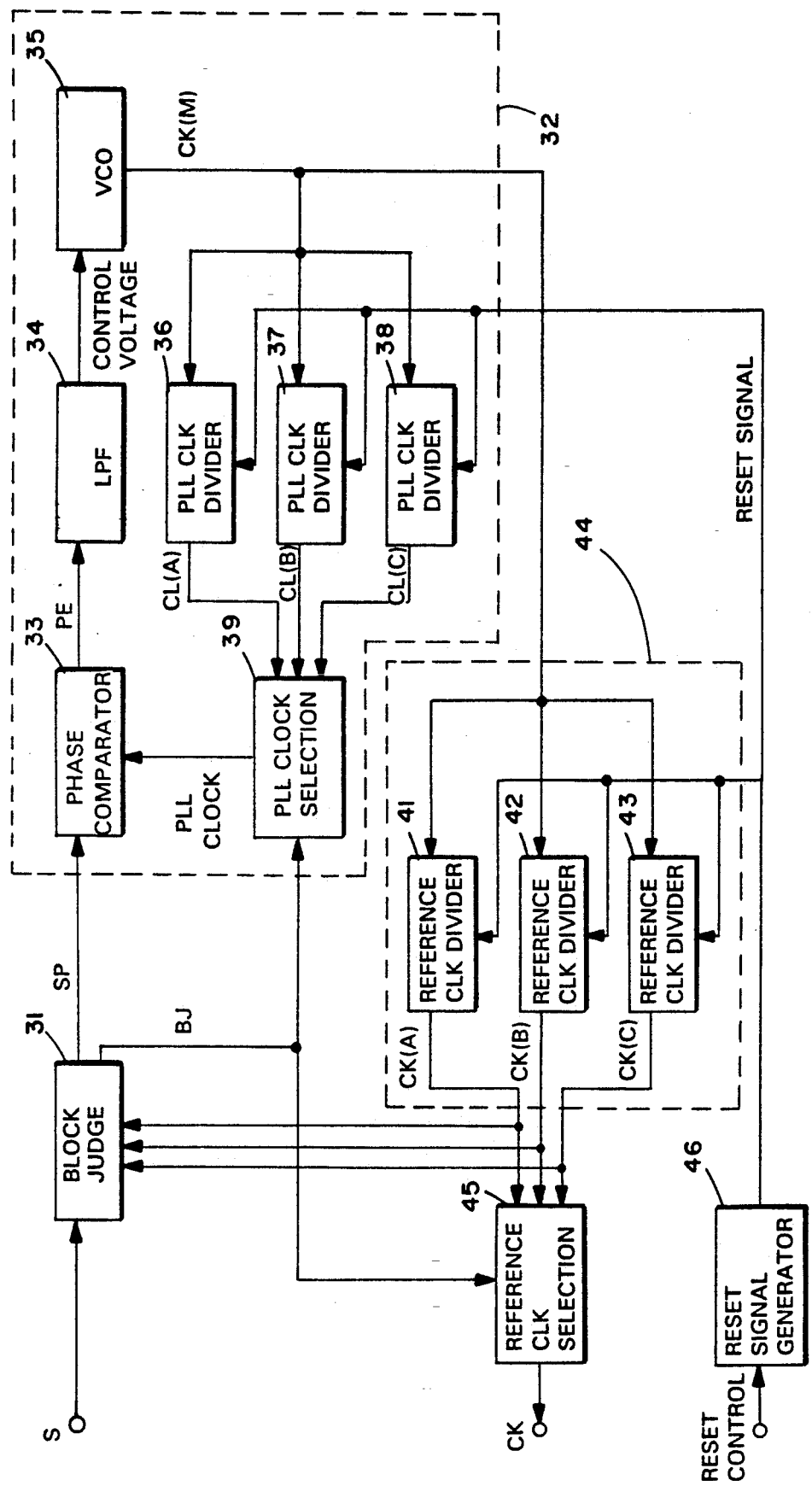
FIG. 1 is a block diagram showing an apparatus according to the invention.

FIG. 1 shows an apparatus according to the invention which can record and reproduce information on and from the above-described optical disk 11. The apparatus of FIG. 1 comprises a block judging unit 31, a PLL circuit 32, a clock signal generator 44, a reference clock signal selection unit 45, and a reset signal generator 46. The PLL circuit 32 includes a phase comparator 33, a low-pass filter 34, a voltage controlled oscillator (VCO) 35, three PLL clock signal frequency dividers 36, 37 and 38, and a PLL clock signal selector 39. The clock signal generator 44 has three reference clock signal frequency dividers 41, 42 and 43.

The optical disk 11 is mounted on the apparatus, and scanned by an optical beam emitted from a semiconductor laser device (not shown) while being rotated at a predetermined constant angular velocity by a suitable driving device (not shown). The optical beam is reflected from the wobbled pits 21, synchronizing pits 22 and data pits 23 of the optical disk 11. The reflected beams are detected to obtain a reproduced signal S from the optical disk. The means for performing the CAV control and the manner of obtaining the reproduced signal is well known in the art, and therefore their detailed description is omitted.

The reproduced signal S is supplied to the block judging unit 31. The block judging unit 31 also receives clock signals CK(A), CK(B) and CK(C) from the reference clock signal frequency dividers 41-43. The block judging unit 31 produces a synchronizing pulse signal SP and a block judging signal BJ. The synchronizing pulse signal SP is input to the phase comparator 33 of the PLL circuit 32. The phase comparator 33 compares the phase of the synchronizing pulse signal SP with that of a PLL clock signal input from the PLL clock signal selector 39, and outputs a phase error signal PE. The phase error signal PE is input to the low-pass filter 34 which in turn outputs a control voltage having a level corresponding to the phase difference between the synchronizing pulse signal SP and the input PLL clock signal.

The control voltage is input to the VCO 35 which generates a mother clock signal CK(M) with a frequency corresponding to the level of the input control voltage and synchronized with the synchronizing pulse signal SP. The mother clock signal CK(M) is supplied to the PLL clock signal frequency dividers 36-38 and also to the reference clock signal frequency dividers 41-43 of the clock signal generator 44.

The PLL clock signal frequency dividers 36-38 divide the mother clock signal CK(M) to respectively generate clock signals CL(A), CL(B) and CL(C). Each of the clock signals CL(A)-CL(C) has a frequency approximately equal to that of the synchronizing pulse signal SP which is produced from the block judging unit 31 when the corresponding one of the blocks 14-16 of the optical disk 11 is irradiated by the optical beam. The clock signals CL(A)-CL(C) are input to the PLL clock signal selector 39. The PLL clock signal selector 39 selects one of the clock signals CL(A)-CL(C) on the basis of the block judging signal BJ output from the block judging unit 31, and then sends out the selected clock signal to the phase comparator 33 as the PLL clock signal.

As mentioned above, the mother clock signal CK(M) is also supplied to the reference clock signal frequency dividers 41-43 of the clock signal generator 44. The frequency dividers 41-43 divide the mother clock signal CK(M) to respectively generate clock signals CK(A), CK(B) and CK(C). Each of the clock signals CK(A)-CK(C) has a frequency corresponding to the period with which the sampling areas 13a in each of the blocks 14-16 are irradiated by the optical beam. The clock signals CK(A)-CK(C) are supplied to the block judging unit 31 as mentioned above, and also to the reference clock signal selection unit 45. Among these clock signals CK(A)-CK(C), the one having the frequency corresponding to the current block is selected by the reference clock signal selection unit 45. The selected clock signal is output as a reference clock signal CK which is employed for performing the servo control, and the record and reproduction of information.

The output of the reset signal generator 46 is connected to the PLL clock signal frequency dividers 36-38 and to the reference clock signal frequency dividers 41-43. When the optical beam irradiates one of the segments 13 which is positioned on the radius A, a control unit (not shown) produces in a conventional manner a reset control signal, and supplies it to the reset signal generator 46. Upon receiving the reset control signal, the reset signal generator 46 generates a reset signal so that the counters of the frequency dividers 36-38 and 41-43 can be reset and the outputs of the frequency dividers can be synchronized.

Figure 5:
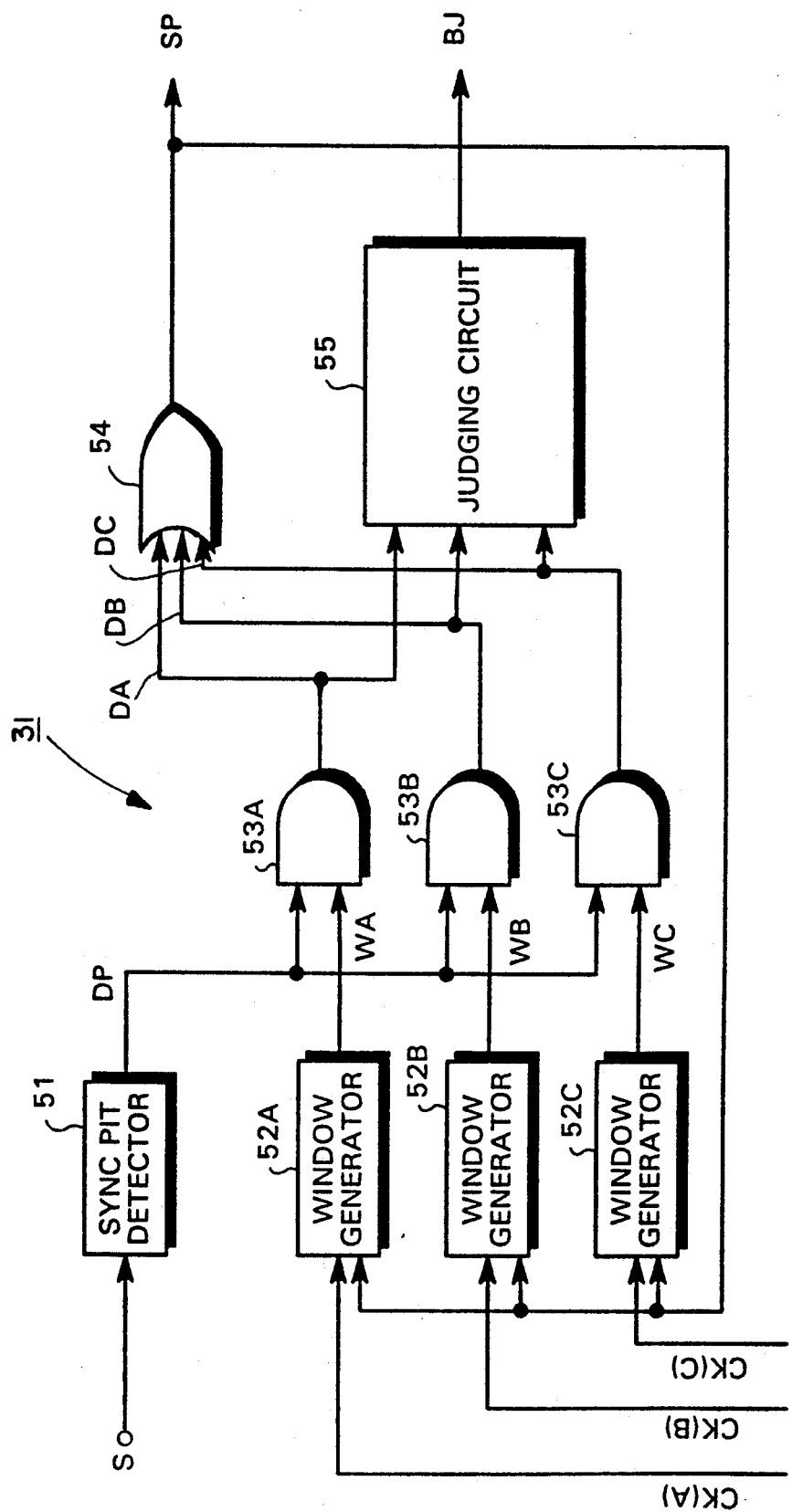
FIG. 5 is a block diagram showing a block judging unit used in the apparatus of FIG. 1.

The manner of generating the synchronizing pulse signal SP and the block judging signal BJ in the block judging unit 31 will be described with reference to FIG. 5. The block judging unit 31 comprises: a synchronizing pit detector 51 to which the reproduced signal S is input; window generators 52A-52C which respectively receive the clock signals CK(A)-CK(C); AND gates 53A-53C, an OR gate 54; and a judging circuit 55.

Figure 6:
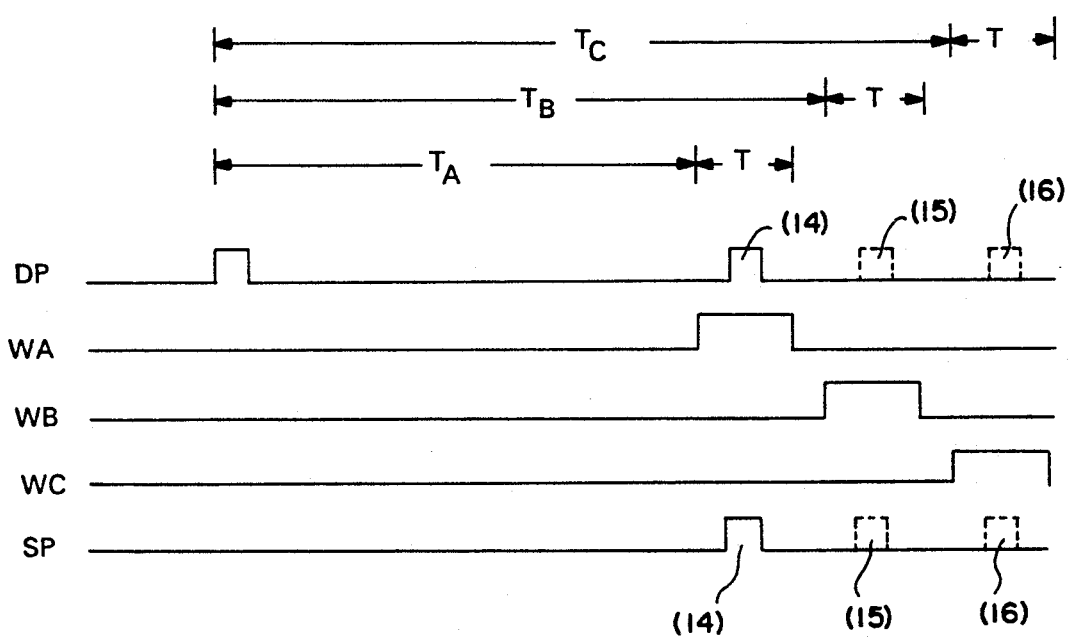
FIG. 6 is a timing chart illustrating the operation of the judging unit of FIG. 5.

As shown in FIG. 6, the window generators 52A-52C, which may be counters, generate respectively synchronizing pit extracting window signals WA, WB and WC for T sec. when the periods of time $T_A$, $T_B$ and $T_C$ have elapsed after the reset ($T_A < T < T_C$, and $T_B - T_A > T$, $T_C - T_B > T$). In the embodiment, the synchronizing pulse signal SP is supplied also to the window generators 52A-52C, to function as a reset signal. The window signals WA-WC are input respectively to the AND gates 53A-53C.

The synchronizing pit detector 51 produces from the reproduced signal S a synchronizing pit detection signal DP which indicates that the synchronizing pit 22 in the current block is irradiated by the optical beam. The synchronizing pit detection signal DP is input to the AND gates 53A-53C. The outputs DA-DC of the AND gates 53A-53C are input to the OR gate 54. When the optical beam irradiates the block 14 (i.e., the block 14 is the current block), the synchronizing pit detection signal DP appears at the timing corresponding to the window signal WA, resulting in that the output DA of the AND gate 53A becomes HIGH while the outputs DB and DC of the AND gates 53B and 53C remain LOW. When the optical beam irradiates the block 15 or 16 (i.e., the block 15 or 16 is the current block), in contrast, the synchronizing pit detection signal DP appears at the timing corresponding to the window signal WB or WC, as shown by the broken line in FIG. 6, and the output DB or DC becomes HIGH. The output DA is output from the OR gate 54 as the synchronizing pulse signal SP.

Figure 4:
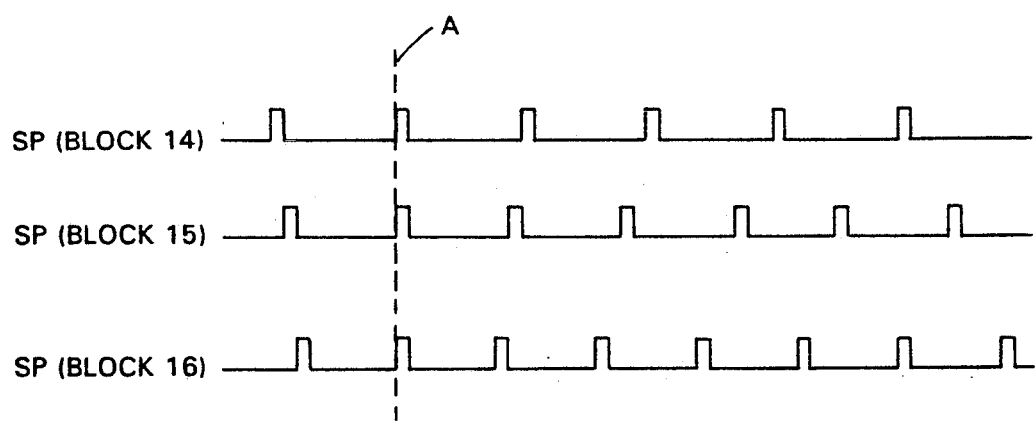
FIG. 4 is a timing chart of the synchronizing pulse signal produced in the apparatus of FIG. 1.

In this way, the synchronizing pulse signal SP is obtained in which the timing of HIGH-period depends on the current block, as shown in FIG. 4. That is, the linear recording density of each track 12 is approximately the same in the blocks 14-16, and the optical disk 11 is rotated under the CAV control so that the period of the synchronizing pulse signal SP obtained from an outer block is shorter than that obtained from an inner block. Since one sampling area 13a of one of the segments 13 of each track 12 is on the same radius A, moreover, the synchronizing pulse signal SP is obtained with the same timing once each revolution of the optical disk 11, irrespective of the position of the optical beam (i.e., whichever block is the current block). FIG. 4 shows the synchronizing pulse signals SP obtained from the blocks 14-16.

The outputs DA-DC of the AND gates 53A-53C are also input to the judging circuit 55. The judging circuit 55 judges that, when the output DA is HIGH, the block 14 is the current block, and similarly that, when the output DB or DC is HIGH, the block 15 or 16 is the current block. According to these judgments, the judging circuit 55 produces the block judging signal BJ indicating the identification of the current block.

The operation of the apparatus of FIG. 1 will be described in more detail. In the PLL circuit 32 which receives the synchronizing pulse signal SP, the VCO 35 generates the mother clock signal CK(M) having a frequency which is an integral multiple of that of the synchronizing pulse signal SP and synchronized with the signal SP. Three clock signals CL(A)-CL(C) are produced from the mother clock signal CK(M) by the PLL clock signal frequency dividers 36-38. The PLL clock signal selector 39 selects in accordance with the input block judging signal BJ one of the clock signals CL(A)-CL(C) which has the same frequency as the synchronizing pulse signal SP. The selected PLL clock signal is input to the phase comparator 33. The phase comparator 33 generates the phase error signal PE corresponding to the phase difference between the input PLL clock signal and the synchronizing pulse signal SP. In the VCO 35 to which the control voltage is supplied from the low-pass filter 34, the frequency of the mother clock signal CK(M) is controlled according to the level of the input control voltage, and then the oscillation frequency of the VCO 35 is controlled by the control voltage so that the above-mentioned phase difference becomes null.

The mother clock signal CK(M) is also supplied to the clock signal generator 44 from which the clock signals CK(A)-CK(C) are generated. The frequencies of the clock signals CK(A)-CK(C) respectively correspond to the periods with which the sampling areas 13a in each of the blocks 14-16 are irradiated by the optical beam. More specifically, the frequencies of the clock signals CK(A)-CK(C) are respectively divided into the sampling frequencies of the wobbled pits 21, synchronizing pits 22 and data pits 23 in the blocks 14-16 (i.e., to the frequencies which are integral multiples of the synchronizing pulse signal SP).

In accordance with the block judging signal BJ from the block judging unit 31, the reference clock signal selection unit 45 selects one of the clock signals CK(A)-CK(C) which has a frequency corresponding to the current block. The selected clock signal is output as the reference clock signal CK, and is used to perform the servo control and the information record and/or reproduction operation against the current block.

According to the invention, no matter which block is the current block, the clock signals CK(A)-CK(C) having a frequency corresponding respectively to the blocks 14-16 are always generated from the clock signal generator 44. Based on the block judging signal BJ, the reference clock signal selection unit 45 selects the clock signal with a frequency corresponding to the current block, from the clock signals CK(A)-CK(C), and outputs it as the reference clock signal CK. When the optical beam moves radially on the optical disk 11 from one block to another, the block judging means 31 immediately know the new current block, i.e., the contents of the block judging signal BJ output from the block judging means 31 are rapidly changed to indicate the new current block, with the result that the stabilized clock signal CK having a frequency corresponding to the current block can be quickly obtained. Therefore, the servo control and the information record and/or reproduction operation can be performed rapidly. Moreover, the transient response of the PLL circuit can be suppressed by the switching of the PLL clock signal selector 39, thereby further shortening the time required for moving the optical beam According to the invention, therefore, the storage capacity of an optical disk can be increased using the sample servo method and performing the M-CAV control without increasing the overall access time.

In another embodiment, the PLL clock signal frequency dividers 36-38 and the PLL clock signal selector 39 are not provided, and a clock signal which is obtained by dividing the reference clock signal CK is supplied to the phase comparator 33 of the PLL circuit 32. The manner of dividing tracks of an optical disk into blocks and the number of clock signal frequency dividers are not restricted to the above, and may be adequately selected to comply with the object of the system. In another optical disk according to the invention, two or more common radii A may be provided so that the sampling areas 13a of two or more segments 13 in each track 12 are respectively positioned on the radii A.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A servo control apparatus for a device which records information on or reads information from an optical disk having a plurality of concentric blocks including plural sample areas and data regions, comprising:
   controlling means for controllably directing an optical beam to impinge upon a location on said optical disk in response to a reference clock signal;
   block judging means for judging which of said plurality of concentric blocks said optical beam is impinging upon;
   clock signal generating means for generating a plurality of clock signals simultaneously, each of said plurality of clock signals having a different frequency corresponding to the period that different sampling areas of each of the different blocks are impinged upon by said optical beam;
   clock signal selecting means for selecting said reference clock signal from said plurality of clock signals generated by said clock signal generating means on the basis of which block said block judging means has judged said optical beam to be impinging upon; and
   means for providing said reference clock signal to said controlling means.

2. An apparatus according to claim 1, wherein said apparatus further comprises a mother clock signal generating means for generating a mother clock signal, said mother clock signal being supplied to said clock signal generating means.

3. An apparatus according to claim 2, wherein said mother clock signal generating means is a phase lock loop circuit.

4. An apparatus according to claim 2, wherein said clock signal generating means comprises a plurality of frequency dividers for dividing said mother clock signal, the outputs of said frequency dividers being supplied to said clock signal selecting means as said clock signals.

5. An apparatus according to claim 4, wherein said apparatus further comprises a reset means for resetting said frequency dividers.

6. An apparatus according to claim 1, wherein said apparatus further comprises a driving means for rotating said optical disk at a predetermined angular velocity.

7. A servo control apparatus for control of recording and reproducing information transferred onto and from an optical disk via an optical signal, the optical disk having plural concentric block areas, each block having at least one concentric track and each track being divided into plural segments with each segment having a sampling area and a data area, comprising:
   means for generating simultaneously plural reference clock signals having different frequencies associated with a block's radial position on the optical disk and to periods when the optical signal impinges on sampling areas in a particular block;
   means for receiving the plural reference clock signals and an information signal corresponding to the optical signal;
   means for determining a current block upon which the optical signal currently impinges and generating a current block signal;
   means for selecting one of the reference clock signals based on the current block signal; and
   means for providing the selected clock signal for control of the optical signal.

8. The apparatus according to claim 7, wherein the means for determining also generates a synchronization signal and the apparatus further comprises:
   a phase-locked loop (PLL) circuit including:
   a voltage-controlled oscillator for generating a base clock signal;
   a plurality of PLL clock dividers for generating different PLL clock signals from the base clock signal;
   a PLL clock selector for selecting one of the PLL clock signals based on the current block signal; and
   a phase comparator for comparing the selected PLL clock signal with the synchronization signal and generating an error signal for controlling the voltage-controlled oscillator.

9. An apparatus according to claim 8, wherein each block requires different frequency synchronization signals based on the number of segments in each block, all of the synchronization signals aligned with and referenced from a common radius on the optical disk.

10. The apparatus according to claim 7, wherein the determining means includes:
    a detector for detecting a block synchronization signal in the information signal, and
    plural logic gates, each logic gate receiving the detected synchronization signal and a window pulse signal corresponding to one of the reference clock signals and selecting its corresponding reference clock signal when the detected synchronization signal is received during the corresponding window pulse signal.

11. The apparatus according to claim 7, wherein the number of segments included in each track of an outer block is greater than the number of segments included in each track of an inner block, the inner block having a smaller radial position on the optical disk relative to the outer block.

12. The apparatus according to claim 7, wherein a mean length of each segment in each block is substantially equal.

13. The apparatus according to claim 7, wherein one of the sampling areas in each track of all blocks is positioned on the same radius of the optical disk.

* * * * *